Nov. 3, 1942.  A. S. VOLPIN  2,300,835
SEAL FOR VALVE STEMS
Filed May 16, 1940
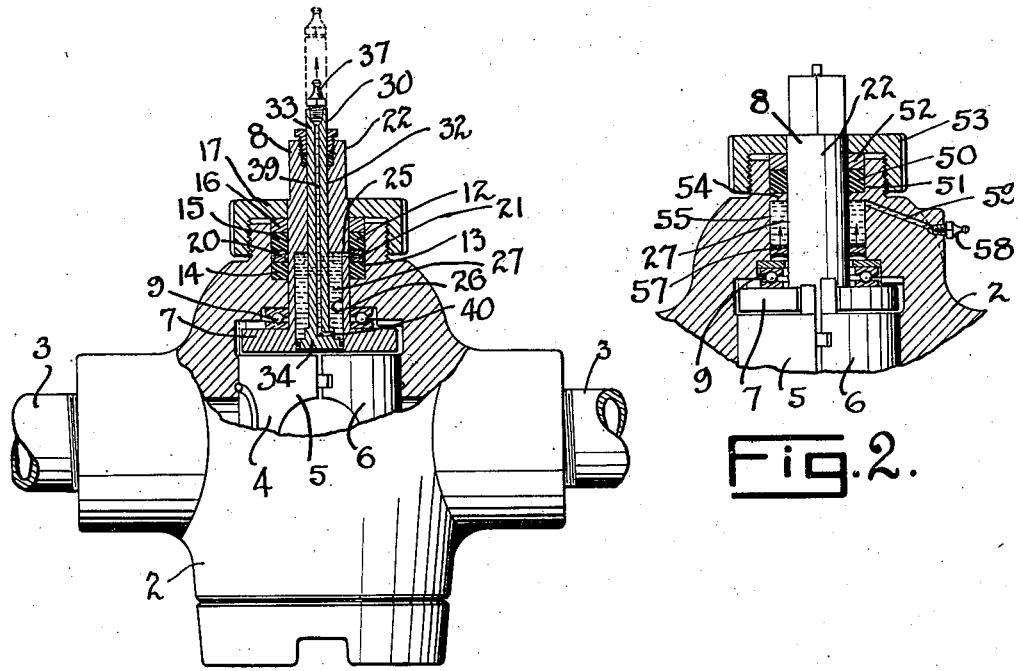
Fig.1.
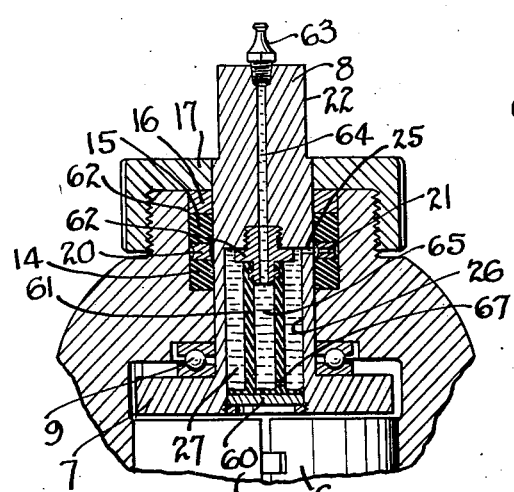
Fig.3.
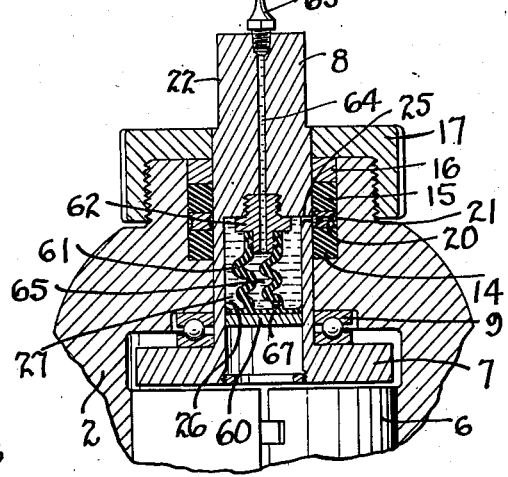
Fig.2.
Fig.4.
A.S. VOLPIN
INVENTOR.
Jesse R. Stone
Lester B. Clark
BY  ATTORNEYS.

Patented Nov. 3, 1942

2,300,835

UNITED STATES PATENT OFFICE 2,300,835

SEAL FOR VALVE STEMS

Alexander S. Volpin, Houston, Tex., assignor to Mission Manufacturing Company, a corporation Application May 16, 1940, Serial No. 335,453

2 Claims. (Cl. 251—93)

The invention relates to a seal for valve stems wherein the pressure being controlled by the valve is utilized to set up a differential pressure to be applied in maintaining a seal about the valve stem.

It is one of the objects of the invention to provide a seal for valve stems wherein the pressure controlled by the valve is applied to a fluid to set up a pressure in such fluid in excess of the applied pressure by utilizing differential areas so that the higher pressure will be applied to maintain a seal about the valve stem.

Another object of the invention is to provide an indicator exterior of the valve to show the volume of fluid available to apply pressure to the seal about the valve stem.

Another object of the invention is to provide a reservoir for lubricant to be applied to maintain a seal about a valve stem wherein such reservoir is subjected to the pressure being controlled by the valve.

Another object of the invention is to apply a differential pressure to a lubricant in maintaining a seal about a valve stem.

A still further object of the invention is to provide a slidable plunger assembly which is subjected to the line pressure in a valve and the movement thereof utilized to apply pressure to the valve stem packing.

Another object of the invention is to provide a movable barrier wherein the line pressure tends to move such barrier in applying a pressure to lubricant in maintaining a seal about the valve stem.

Still another object of the invention is to provide a movable barrier including a sleeve portion wherein a leak is provided to allow the passage of lubricant to maintain a seal due to the pressure on the barrier from the line which carries the valve.

Other and further objects of the invention will be readily apparent when the following description is considered in connection with the accompanying drawing wherein:

Fig. 1 is a side elevation of the valve with certain parts in section to illustrate the construction thereof.

Fig. 2 shows a modified form of the invention wherein the reservoir is positioned in the valve housing as distinguished from the valve stem in Fig. 1.

Figs. 3 and 4 show another form of the invention wherein a movable barrier is provided to create the differential pressure upon the lubricant being applied.

In Fig. 1 the valve housing is indicated generally at 2 and the line through which the pressure flows which is to be controlled by the valve is shown at 3. The valve member 4 may be of any desired type but is here shown as being made up of the sections 5 and 6 which are arranged to be actuated by the head 7 operated by a stem 8. Antifriction bearings 9 may be provided to take the thrust on the head 7.

A packing 12 is provided about the valve stem and is positioned in a recess 13. This packing may be made up of the lower packing ring 14, the upper packing ring 15, the hold-down plate 16, and the cap 17, whereby the assembly is confined in the recess 13. A spacer ring 20 is positioned between the lower packing 14 and the upper packing 15 and has an opening 21 therein whereby fluid may flow therethrough into the area between the packings 14 and 15. In this manner a fluid or suitable lubricant can be applied under pressure to the area between the packing in order to assist in maintaining a seal with the surface of the recess 13 and the periphery 22 of the valve stem 8.

In order to apply fluid under pressure to the spacer ring 20 a port 25 is provided in the valve stem leading from a recess or chamber 26 in the valve stem. This chamber is of a length to extend from the bottom of the stem up to at least the elevation of the packing assembly 12. A body of lubricant or suitable fluid 27 under pressure is maintained in this chamber or reservoir 26 so that it can be forced through the opening or port 25 into the packing.

A plunger 30 is shown as being positioned within the opening 32 in the stem. This plunger has a rod-like portion 33 and a piston or head 34 on the lower end which is suitably sealed with the inside of the reservoir 26. This plunger is capable of sliding movement within the stem and the bottom face of the piston 34 opens into the valve chamber so that the pressure in the line 3 is available against the plunger and will tend to move the plunger upwardly against the lubricant or fluid 27 in the chamber 26.

Lubricant or fluid may be introduced through the plunger 30 by means of the fitting 37 and will pass downwardly through the bore 39 where it will discharge into the chamber from the lateral outlet 40.

When the fluid 27 is introduced the plunger 30 will be forced downwardly to the position shown in Fig. 1 and because of the fact that the pressure in the line 3 is available in the valve chamber and against the lower face of the piston 34 it seems obvious that the plunger will be normally urged upwardly by a force equal to the unit area pressure times the exposed area of the plunger 34, whereas the pressure resisting such movement of the plunger will be the same less the cross sectional area of the rod 33, which is, of course, exposed to atmospheric perssure where it extends from the top of the stem 8. In this manner a differential pressure is applied to the fluid 27, which is increased over the line pressure by the differential area of the piston 34. In other words, a higher unit area pressure will be applied to the lubricant 27 and to the packing 12 than is available in the valve chamber and around the periphery 22 of the stem. In this manner this differential pressure will preclude any leakage along the stem. The movement of the plunger 30 serves as an indicator or telltale as to the amount of liquid or lubricant present in the chamber 26.

It is to be understood that any suitable fluid or lubricant in various forms may be utilized in the device so long as it will flow through the ports and openings when subjected to the contemplated pressures. The telltale feature is of advantage because it indicates the volume of fluid which is available for pressure purposes and determines when the supply may be replenished.

Fig. 2 shows a slightly modified form of the device wherein a single packing ring 50 is provided in a recess 51. A hold-down plate 52 and a cap 53 hold the packing in place upon a shelf or flange 54 that may be formed on the inside of the housing 2. A reservoir 55 is formed in the housing below the flange 54 and is arranged to receive the lubricant or fluid 27. A barrier or piston 57 is slidable in the reservoir 55 and may be made up of any suitable material to provide a seal with the inside of the reservoir 55 and the periphery 22 of the valve stem 8. The other parts of the valve are the same as described in connection with Fig. 1 in that the pressure from the line 3 will be available in the valve chamber and will be exerted on the bottom of the barrier 57 tending to force it upwardly so as to cause the lubricant to flow past the flange 57 into the packing 50. It is intended that this barrier 57 will theoretically prevent all leakage thereby and for this reason it is free to float beneath the lubricant or pressure fluid and, if an unbalanced pressure condition arises, the barrier can move upwardly until the pressure on the opposite sides thereof are balanced. It serves as a retainer for the fluid or lubricant to keep it from leaking into the valve and to prevent contamination of the fluid 27. When the fluid 27 is to be renewed it will be introduced through a fitting 58 and the bore 59.

Figs. 3 and 4 show a slightly modified form of the device of Fig. 1 wherein the plunger 30 has been omitted and a barrier 60 introduced into the reservoir 26. This barrier includes a cylindrical sleeve 61 extending into the reservoir 26 and which is affixed to a fitting 62 carried by the stem 8 at the top of the recess or reservoir 26. This sleeve 61 is composed of flexible material such as oil resistant rubber or any suitable pliable or resilient substance. The lower face of the barrier 60 is exposed to the pressure passing through the valve the same as is the piston 34 in Fig. 1, and the fact that the upper side of the barrier is exposed to a lesser area in contact with the liquid 27 by an amount which is equal to the cross section area of the annulus which comprises the sleeve 61, causes a differential pressure to be applied to the lubricant. Thus the thickness of the sleeve 61 can be varied to obtain different pressure differentials. The lubricant is introduced into this form through a fitting 63, the bore 64, and to the interior 65 of the sleeve 61. A leak port 67 is provided in the sleeve 61 so that the lubricant or pressure fluid can escape therefrom and flow into the reservoir 26 and through the opening 25 into the packing. The parts of the packing in this form are the same as described in connection with Fig. 1.

Fig. 4 shows the construction of Fig. 3 wherein a portion of the pressure fluid has escaped and the barrier 60 has moved upwardly to collapse the sleeve 61.

Broadly the invention contemplates an automatic lubricating feature for valve stem packings wherein a differential pressure is applied to maintain a fluid seal in the packing.

What is claimed as new is:

1. A valve including a housing, a rotatable valve member therein, a stem to turn said member, a packing carried by the housing about said stem, a reservoir for liquid in said stem, a barrier defining one end of said reservoir, a resilient sleeve supporting said barrier, a passage from the reservoir to said packing, an entry to said barrier for the line pressure on the valve, and means to introduce liquid into said sleeve and reservoir so that the line pressure on said barrier will force the liquid into said packing.

2. A valve including a housing, a rotatable valve member therein, a stem to turn said member, a packing carried by the housing about said stem, a reservoir for liquid in said stem, a barrier defining one end of said reservoir, a resilient sleeve supporting said barrier, a passage from the reservoir to said packing, an entry to said barrier for the line pressure on the valve, and means to introduce liquid into said sleeve and reservoir so that the line pressure on said barrier will force the liquid into said packing, said sleeve being collapsible to permit movement of the barrier in feeding the liquid.

ALEXANDER S. VOLPIN.